United States Patent [19]

Bartlett

[11] Patent Number: 4,600,530
[45] Date of Patent: Jul. 15, 1986

[54] AEROSOL CORROSION INHIBITORS

[75] Inventor: Philip L. Bartlett, Wilmington, Del.

[73] Assignee: E. I. Du Pont de Nemours and Company, Wilmington, Del.

[21] Appl. No.: 716,479

[22] Filed: Mar. 27, 1985

[51] Int. Cl.$^4$ .............................................. C09K 3/30
[52] U.S. Cl. ................................... 252/392; 252/394; 252/305; 424/45; 424/47; 424/126; 424/46; 424/68; 424/70; 424/76; 424/DIG. 1; 424/DIG. 2
[58] Field of Search ...................... 252/305, 392, 394; 424/45, 47, 126

[56] References Cited

U.S. PATENT DOCUMENTS

| | | | |
|---|---|---|---|
| 2,629,649 | 2/1953 | Wachter et al. | 252/305 X |
| 2,739,871 | 3/1956 | Senkus | 428/485 |
| 3,650,981 | 3/1972 | Inouye et al. | 252/305 X |
| 3,650,982 | 3/1972 | Flanner | 252/305 X |
| 3,787,227 | 1/1974 | Marans | 252/392 X |
| 3,989,640 | 11/1976 | Culver et al. | 252/392 X |
| 4,052,322 | 6/1976 | Crookshank | 252/18 |
| 4,195,977 | 4/1980 | Newman | 44/71 |

OTHER PUBLICATIONS

"Handbook of Aerosol Technology," Paul A. Sanders, 210.
Glessner Article—"Aerosol Age" (10/64), Handbook of Aerosol Technology.

Primary Examiner—John F. Terapane
Assistant Examiner—Matthew A. Thexton

[57] ABSTRACT

Corrosion inhibitor compositions comprising a mixture of a nitroalkane containing 1–3 carbon atoms and a tertiary $C_{12-14}$ alkylammonium carboxylate selected from the group consisting of a $C_{12-14}$ alkylammonium benzoate and a tertiary $C_{12-14}$ alkylammonium-N-oleoyl sarcosinate. Such compositions are useful in inhibiting corrosion on the interior surfaces of tin-plated aerosol cans containing water-based aerosol formulations.

12 Claims, No Drawings

AEROSOL CORROSION INHIBITORS

BACKGROUND OF THE INVENTION

1. Field of the Invention

This invention relates to corrosion inhibitor compositions which are useful in inhibiting corrosion in aerosol products.

2. Description of the Prior Art

Many products designed for household, personal, automotive and other types of use are available as aerosol products. Typical examples of such products include personal products such as hair care products (sprays, coloring agents and styling/conditioning mousses), deodorants, antiperspirants, first aid sprays, and colognes; household products such as waxes, polishes, pan sprays, insecticides and room fresheners; automotive products such as cleaners and polishes; industrial products such as cleaners, lubricants and mold release agents; and animal care products such as tick and flea repellents.

Although some aerosol products are packaged in glass bottles or aluminum cans or lined steel cans, most formulations are loaded into unlined cans made of tin-plated steel. While the tin affords protection against corrosion, the thinness of the coating, imperfections in the surface, wear and tear, and chemical action may ultimately expose the steel to the contents of the can and corrosion can result. When aerosol formulations contain less than about 80 ppm (parts per million) water, corrosion of tin-plate cans is not generally a serious problem. However, if the water content of an aerosol formulation is more than 80 ppm, problems due to corrosion are more likely to occur.

The introduction of dimethyl ether (DME) as an aerosol propellant has opened the way to the use of more water-based aerosol formulations and made possible the manufacture of products of lesser flammability and lower ingredient cost. However, the use of water in such aerosol formulations also increases the problem of corrosion on the interior of the tin-plated steel cans which are so widely used, thus leading to contamination of the aerosol product and ultimately to leaking of the can if corrosion is severe enough. For this reason, corrosion inhibitors are used with aerosol propellants containing DME, when this propellant is to be used in tin-plated steel cans containing a water-based formulation.

The matter of inhibiting corrosion in an aerosol can presents the dual problem of achieving corrosion inhibition in a system where there is both liquid and vapor phase contact with the metal. In a system that contains DME and water, corrosion of the can in areas in contact with the vapor phase is aggravated by the fact that relatively large amounts of water vapor are present along with the DME propellant in the vapor space above the liquid contents of the container. For example, the vapor phase of a 95/5 wt % dimethyl ether/water system contains 7,750 ppm water vapor at 70° F. (21.1° C.). Moreover, the addition of ethanol to a DME/water system will often exacerbate the problem of vapor phase corrosion. A 90/5/5 (wt %) DME/ethanol/water system will contain 9,100 ppm water vapor at 70° F.

SUMMARY OF THE INVENTION

Many commercially available corrosion inhibitors are either ineffective for aerosol systems containing DME or they fail to provide adequate protection against both liquid phase and vapor phase corrosion. It often happens that a corrosion inhibitor gives good protection where the liquid phase is in contact with the can but fails to provide protection in areas where the interior surfaces of the can are in contact with vapor during storage. The reverse can also occur where the inhibitor gives good protection on the interior where there is contact with vapor, but poor protection where liquid normally contacts the container. The present invention provides an improvement in aerosol compositions containing an aqueous aerosol-dispersible media and a propellant gas in which the improvement comprises the presence of a corrosion inhibitor in the aerosol composition in a minor amount sufficient to provide corrosion inhibition to the composition. The corrosion inhibitor which constitutes the improvement in the aerosol composition is effective against both vapor phase and liquid phase corrosion, and it is comprised of about 15 to 85 wt % of a nitroalkane containing 1-3 carbon atoms and about to 85 to 15 wt % of a tertiary $C_{12-14}$ alkylammonium carboxylate selected from the group consisting of tertiary $C_{12-14}$ alkylammonium benzoate and tertiary $C_{12-14}$ alkylammonium-N-oleoyl sarcosinate. Such corrosion inhibitors are useful in a wide variety of aerosol compositions where there is a need to protect the container from corrosive attack. As a general rule, this includes aerosol compositions in which the formulation is water-based. Because of the compatibility of DME with water, it is common in the aerosol industry to use DME as the propellant gas either alone or in combination with other well known aerosol propellants. Propellants such as, chlorodifluoromethane (FC-22), 1-chloro-1,1-difluoroethane (FC-142b), 1,1-difluoroethane (FC-152a), hydrocarbons such as butane, isobutane and propane and compressed gases such as $CO_2$ and nitrogen and mixtures of these propellants can be used in water-based aerosol formulations with or without DME. The corrosion inhibitor compositions of this invention can be used in aerosols containing any of these propellants or combinations thereof. The introduction of the inhibitor into the propellant prior to loading into the aerosol can is a convenient way to incorporate the inhibitor into the final aerosol formulation, and therefore, one of the objects of the invention to provide aerosol propellant compositions containing one or more propellants, such as those described above, in combination with the corrosion inhibitor in an amount sufficient to provide corrosion inhibition in water-based aerosols.

The effectiveness of the two components of the corrosion inhibitor compositions of the invention is not additive or supplementary but is greater than expected or predicted from the performance of the individual ingredients. Thus, neither the nitroalkanes nor the alkylammonium carboxylates performed entirely satisfactorily as corrosion inhibitors in the liquid or the vapor phase of the aerosol formulations evaluated. Hence, it is clear that the effectiveness of the corrosion inhibitor compositions of the invention is not simply the result of blending liquid phase and vapor phase inhibitors.

DETAILED DESCRIPTION

The corrosion inhibitor compositions of this invention can be prepared by mixing commercially available materials. Nitroalkanes are, of course, well known compounds which are readily available commercially. Examples of the nitroalkanes which are useful include nitroethane, 1-nitropropane and nitromethane, the latter being the preferred compound. The tertiary $C_{12-14}$ alkylammonium carboxylates can be prepared by mixing equimolar amounts of amine and carboxylic compound. The amines that are used are tertiary $C_{12-14}$ alkyl primary amines, such as "Primene 81-R" which is a mixture of tertiary $C_{12-14}$ alkyl primary amines having highly branched alkyl chains and molecular weights in the range of 185-213 and a neutralization equivalent of 191. The carboxylic compound which is mixed with the amine can be benzoic acid (mol wt 122) or oleoyl sarcosine (mol wt 353). The latter compound has the emperical formula,

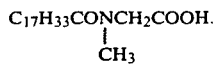

It is the amide of oleic acid and sarcosine ($CH_3NHCOOH$) also referred to as N-methyl glycine. Oleoyl sarcosine is available commercially and such products usually come in admixture with small amounts (up to 6 wt %) free oleic acid which should be taken into consideration in determining the amount of sarcosine needed to be equimolar to the amine.

The proportion of the two constituents that form the inhibitor composition can be in the range of 15 to 85 wt % nitroalkane and 85 to 15 wt % carboxylate. A preferred range is 15 to 50 wt % nitroalkane and 85 to 50 wt % carboxylate. A 50/50 mixture by weight is a preferred composition. The optimum concentration of inhibitor composition needed to obtain effective corrosion inhibition will, of course, vary with the formulation in which it is to be used, and it can be determined by storage tests, such as those described in the Examples. Generally, the effective concentration range is 0.2 to 2 wt % based on the total weight of the aerosol formulation including the weight of a propellant as well as the weight of the other ingredients. A preferred weight range is 0.5 to 1 wt % of the aerosol formulation. The inhibitors can be added directly to the aerosol can either alone or mixed with other non-pressurized ingredients, or if preferred, they can be introduced as solutions in the propellant in an amount which when incorporated with the other ingredients will provide the desired 0.2 to 2 wt % of corrosion inhibitor in the final composition.

The composition of the aqueous aerosol-dispersible media which is, in essence, the formulation containing the active ingredients, will, quite naturally, depend upon the use for which the aerosol is designed. Such formulations are well known to persons skilled in the art, and the choice of formulation is not critical to the use of the invention so long as the medium is compatible with the components of the inhibitor composition. The use of the corrosion inhibitors in tin-plated cans with dry-type antiperspirants containing aluminum chlorohydrate is not recommended. Lined cans should be used in these instances.

EXAMPLES

Sixty-day corrosion tests at 120° F. (48.9° C.) were run on the corrosion inhibitors in three aerosol formulations. These formulations were selected as being representative of commercial products, in their chemical compositions. Distilled water was used in each of the five formulations because it was readily available in the laboratory. However, similar results would be expected with deionized water which is often used in commercial aerosols.

| Component | Wt. % |
|---|---|
| Formulation No. 1 | |
| Insecticide (pH = 6) | |
| Natural pyrethrins | 1.50 |
| Piperonyl butoxide | 0.65 |
| Polyglyceryl fatty acid ester surfactant ("Witconol 14" Witco Chemical Corp.) | 0.97 |
| Ethanol (SDA 40-1) | 10.01 |
| Water (distilled) | 51.87 |
| Dimethyl ether | 35.00 |
| Formulation No. 2 | |
| Insecticide (pH = 5) | |
| Phosphorothioic acid O, O—diethyl O—(3,5,6-trichloro-2-pyridyl) ester | 0.98 |
| Natural pyrethrins | 0.06 |
| Piperonyl butoxide | 0.13 |
| Polyglyceryl fatty acid ester surfactant | 0.20 |
| Water (distilled) | 63.63 |
| Dimethyl ether | 35.00 |
| Formulation No. 3 | |
| Hairspray (pH = 7.2) | |
| Vinyl acetate/crotonic acid/vinyl neodecanoate terpolymer | 2.50 |
| 2-amino-2-methyl-1-propanol | 0.20 |
| Modified lauric alkanolamide | 0.10 |
| Silicone glycol copolymer | 0.05 |
| Ethanol (SDA 40-1) | 37.15 |
| Water (distilled) | 10.00 |
| Chlorodifluoromethane (FC-22) | 20.00 |
| Dimethyl ether | 30.00 |

Procedure

All of the examples were prepared using the following procedure. The active ingredients were weighed individually into an eight-ounce three-piece aerosol can $2\frac{1}{8}''$ in diameter and 5 9/16" long, except when the corrosion inhibitors were added to the aerosol can as a solution in the propellant (noted in tables). The can was purged with dichlorodifluoromethane (FC-12) vapor to displace the air in the container. The aerosol can valve was then placed into the can and crimped. The propellants were introduced into the can as liquids through the aerosol valve. Volume amounts corresponding to the weights of the propellants were calculated prior to loading, and a glass, calibrated, pressure buret was used to measure and transfer the liquids from storage cylinders to the can. A nitrogen gas pressure of 100 psig applied to the buret to aid in transferring the liquids from the buret to the can. After the propellant was loaded, the can was weighed, and the weight of propellant recorded.

The aerosol cans used in the corrosion tests were commercially available containers and are described in trade literature as: one inch round dome top unlined aerosol containers, size 202×509 ($2\frac{1}{8}''$ diameter, 5 9/16" can wall height), 0.25 lb. electrolytic tin-plated (ETP), full concave bottom with welded side seam.

A corrosion test rating system was used which provides a complete visual description of the appearance of the interior surface of the tin-plated steel aerosol cans after 60 days storage at 120° F.

| CAN CORROSION - RATING SYSTEM | |
|---|---|
| Rating* | Description |
| 0 | No Corrosion |

-continued

| CAN CORROSION - RATING SYSTEM | |
|---|---|
| Rating* | Description |
| 1 | Trace Corrosion |
| 2 | Light Corrosion |
| 3 | Moderate Corrosion |
| 4 | Heavy Corrosion |
| 5 | Severe Corrosion |

*This numerical rating is an overall assessment of the total can (tin-plate, joints and side seams) and represents the primary rating of a test. A rating of 0-2 is considered effective and 3 or greater is a failed rating.

of a mixture of tertiary $C_{12-14}$ alkyl amines from Rohm and Haas Company ("Primene 81-R" neutralization equivalent 191) in a 500 ml beaker and then adding 0.5 mol (61 g) of benzoic acid while stirring. The final product was a very viscous amber liquid. The tertiary $C_{12-14}$ alkyl ammonium-N-oleoyl sarcosinate was prepared by thoroughly mixing 100 g of commercially available oleoyl sarcosine [Sarkosyl ® 0 from Ciba-Geigy Corporation containing 6 g (0.02 mol) oleic acid and 94 g (0.27 mol) oleoyl sarcosine] with 0.29 mol (55.4 g) of "Primene 81-R". The final product was a viscous amber liquid.

TABLE NO. 1

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 days at 120° F. | Formulation No. 1 | 5 | Bottom detinned; rust on walls; vapor phase rusted |
| Tertiary $C_{12-14}$ alkylammonium-N—oleoyl sarcosinate | 0.50 | 60 days at 120° F. | Formulation No. 1 | 1 | Slight vapor phase corrosion |
| Tertiary $C_{12-14}$ alkylammonium benzoate | 0.50 | 60 days at 120° F. | Formulation No. 1 | 2 | Light corrosion on side seams and bottom-joint; slight vapor phase rusting |
| Nitromethane | 0.50 | 60 days at 120° F. | Formulation No. 1 | 3 | Moderate corrosion in liquid and vapor; detinning in liquid |
| Tertiary $C_{12-14}$ alkylammonium benzoate | 0.25 | 60 days at 120° F. | Formulation No. 1 | 0 | No corrosion |
| Nitromethane | 0.25 | | | | |
| Tertiary $C_{12-14}$ alkylammonium-N—oleoyl sarcosinate | 0.25 | 60 days at 120° F. | Formulation No. 1 | 0 | No corrosion |
| Nitromethane | 0.25 | | | | |

The tertiary $C_{12-14}$ alkylammonium benzoate used was prepared by heating to 55°-60° C. 0.5 mol (95.5 g)

TABLE NO. 2

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 days at 120° F. | Formulation No. 2 | 5 | Severe corrosion in liquid and vapor phase |
| Tertiary $C_{12-14}$ alkylammonium-N—oleoyl sarcosinate | 0.50 | 60 days at 120° F. | Formulation No. 2 | 2 | Light vapor Phase corrosion |
| Tertiary $C_{12-14}$ alkylammonium benzoate | 0.50 | 60 days at 120° F. | Formulation No. 2 | 2 | Light vapor phase corrosion |
| Nitromethane | 0.50 | 60 days at 120° F. | Formulation No. 2 | 5 | Similar to control |
| Tertiary $C_{12-14}$ alkylammonium benzoate | 0.25 | 60 days at 120° F. | Formulation No. 2 | 0 | No corrosion |
| Nitromethane | 0.25 | | | | |
| Tertiary $C_{12-14}$ alkylammonium-N—oleoyl Sarcosinate | 0.25 | 60 days at 120° F. | Formulation No. 2 | 0 | No corrosion |
| Nitromethane | 0.25 | | | | |

TABLE NO. 3

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 days at 120° F. | Formulation No. 3 | 5 | Severe liquid phase detinning; spots of rusting and detinning in vapor zone |
| Tertiary $C_{12-14}$ alkylammonium-N—oleoyl sarcosinate | 0.50 | 60 days at 120° F. | Formulation No. 3 | 4 | Severe liquid phase detinning; no rusting evident |
| Nitromethane | 0.50 | 60 days at 120° F. | Formulation No. 3 | 5 | Same as control, except large rust areas in both phases |
| Tertiary $C_{12-14}$ alkylammonium-N—oleoyl sarcosinate | 0.10 | 60 days at 120° F. | Formulation No. 3 | 4 | Severe liquid phase detinning |
| Nitromethane | 0.10 | | | | |
| Tertiary $C_{12-14}$ alkylammonium-N—oleoyl sarcosinate | 0.25[a] | 60 days at 120° F. | Formulation No. 3 | 4 | Severe liquid phase detinning |
| Nitromethane | 0.25 | | | | |
| Tertiary $C_{12-14}$ alkylammonium-N—oleoyl sarcosinate | 0.50[a] | 60 days at 120° F. | Formulation No. 3 | 2 | Light liquid phase detinning |
| Nitromethane | 0.50 | | | | |
| Tertiary $C_{12-14}$ alkylammonium-N—oleoyl sarcosinate | 1.00[a] | 60 days at 120° F. | Formulation No. 3 | 3 | Moderate liquid phase detinning |
| Nitromethane | 1.00 | | | | |
| Tertiary $C_{12-14}$ alkylammonium-N—oleoyl sarcosinate | 0.10[a] | 60 Days at 120° F. | Formulation No. 3 | 3 | Moderate liquid phase detinning |
| Nitromethane | 0.50 | | | | |
| Tertiary $C_{12-14}$ alkylammonium-N—oleoyl sarcosinate | 0.25 | 60 Days at 120° F. | Formulation No. 3 | 3 | Moderate liquid phase detinning |
| Nitromethane | 0.50 | | | | |
| Tertiary $C_{12-14}$ alkylammonium-N—oleoyl sarcosinate | 0.50 | 60 Days at 120° F. | Formulation No. 3 | 2 | Light liquid phase detinning |
| Nitromethane | 0.10 | | | | |
| Tertiary $C_{12-14}$ alkylammonium-N—oleoyl sarcosinate | 0.50 | 60 Days at 120° F. | Formulation No. 3 | 2 | Light liquid phase detinning |
| Nitromethane | 0.25 | | | | |

[a]Corrosion inhibitors were dissolved in propellant and added to aerosol cans as propellant solutions. All other samples were prepared by adding corrosion inhibitors and propellant individually to aerosol cans.

TABLE NO. 4

CORROSION TEST DATA

| Corrosion Inhibitor | Wt. % | Corrosion Test Procedure | Corrosion Test Medium | Test Rating | Description of Test Can Corrosion |
|---|---|---|---|---|---|
| None | — | 60 days at 120° F. | Formulation No. 1 | 5 | Severe detinning in liquid and vapor zones; considerable corrosion in both phases |
| Nitroethane | 0.50 | 60 days at 120° F. | Formulation No. 1 | 3 | Some detinning in liquid phase. Rust spots in liquid and vapor zones |
| 1-Nitropropane | 0.50 | 60 days at 120° F. | Formulation No. 1 | 3 | Some detinning in liquid phase. Rust spots in liquid and vapor zones |
| Tertiary $C_{12-14}$ | 0.25 | 60 days at | Formulation | 1 | Trace detinning |

TABLE NO. 4-continued

| Corrosion Inhibitor | Wt. % | Corrosion Test Procedure | Corrosion Test Medium | Test Rating | Description of Test Can Corrosion |
|---|---|---|---|---|---|
| alkylammonium benzoate | | 120° F. | No. 1 | | in vapor zone |
| Nitroethane | 0.25 | | | | |
| Tertiary $C_{12-14}$ alkylammonium benzoate | 0.25 | 60 Days at 120° F. | Formulation No. 1 | 1 | Trace detinning in vapor zone |
| 1-Nitropropane | 0.25 | | | | |

I claim:

1. In an aerosol composition containing an aqueous aerosol-dispersible medium and a propellant, the improvement which comprises the presence of a corrosion inhibiting composition comprising 15 to 85 wt. % of a nitroalkane containing 1–3 carbon atoms and 85 to 15 wt. % of a tertiary $C_{12-14}$ alkylammonium carboxylate selected from the group consisting of a tertiary $C_{12-14}$ alkylammonium benzoate and a tertiary $C_{12-14}$ alkylammonium-N-oleoyl sarcosinate, said corrosion inhibiting composition being present in an amount sufficient to prevent more than light corrosion of a tin-plated steel aerosol can containing said aerosol composition.

2. The composition of claim 1 in which the nitroalkane is nitromethane and the tertiary $C_{12-14}$ alkylammonium carboxylate is a tertiary $C_{12-14}$ alkylammonium benzoate.

3. The composition of claim 1 in which the nitroalkane is nitromethane and the tertiary $C_{12-14}$ alkylammonium carboxylate is a tertiary $C_{12-14}$ alkylammonium-N-oleoyl sarcosinate.

4. The composition of claim 1 comprising 15 to 50 wt. % of a nitroalkane containing 1–3 carbon atoms and 85 to 50 wt. % of a tertiary $C_{12-14}$ alkylammonium carboxylate.

5. The composition of claim 4 in which the nitroalkane is nitromethane and the tertiary $C_{12-14}$ alkylammonium carboxylate is a tertiary $C_{12-14}$ alkylammonium benzoate.

6. The composition of claim 4 in which the nitroalkane is nitromethane and the tertiary $C_{12-14}$ alkylammonium carboxylate is a tertiary $C_{12-14}$ alkylammonium-N-oleoyl sarcosinate.

7. In an aerosol propellant for use in a water-based aerosol composition, the improvement which comprises the presence of a corrosion inhibiting composition comprising 15 to 85 wt. % of a nitroalkane containing 1–3 carbon atoms and 85 to 15 wt. % of a tertiary $C_{12-14}$ alkylammonium carboxylate, said corrosion inhibiting composition being present in an amount sufficient to prevent more than light corrosion of a tin-plated steel aerosol can containing said aerosol composition.

8. The composition of claim 7 in which the nitroalkane is nitromethane and the tertiary $C_{12-14}$ alkylammonium carboxylate is a tertiary $C_{12-14}$ alkylammonium benzoate.

9. The composition of claim 7 in which the nitroalkane is nitromethane and the tertiary $C_{12-14}$ alkylammonium carboxylate is a tertiary $C_{12-14}$ alkylammonium-N-oleoyl sarcosinate.

10. The composition of claim 7 comprising 15 to 50 wt % of a nitroalkane containing 1–3 carbon atoms and 85 to 50 wt % of a tertiary $C_{12-14}$ alkylammonium carboxylate.

11. The composition of claim 10 in which the nitroalkane is nitromethane and the tertiary $C_{12-14}$ alkylammonium carboxylate is a tertiary $C_{12-14}$ alkylammonium benzoate.

12. The composition of claim 10 in which the nitroalkane is nitromethane and the tertiary $C_{12-14}$ alkylammonium carboxylate is a tertiary $C_{12-14}$ alkylammonium-N-oleoyl sarcosinate.

* * * * *